United States Patent [19]

Hirose

[11] Patent Number: 5,709,140

[45] Date of Patent: Jan. 20, 1998

[54] HYDRAULIC CONTROL DEVICE FOR AUTOMATIC TRANSMISSION

[75] Inventor: Ikuo Hirose, Fuji, Japan

[73] Assignee: Jatco Corporation, Japan

[21] Appl. No.: 670,632

[22] Filed: Jun. 26, 1996

[30] Foreign Application Priority Data

Jun. 29, 1995 [JP] Japan ........................... 7-164026

[51] Int. Cl.$^6$ ................. F15B 13/044; F16H 61/16
[52] U.S. Cl. ........................ 91/459; 477/126
[58] Field of Search .................. 91/459; 477/116, 477/117, 125, 126

[56] References Cited

U.S. PATENT DOCUMENTS

| | | | |
|---|---|---|---|
| 4,984,486 | 1/1991 | Takana et al. | 477/126 |
| 5,010,787 | 4/1991 | Takada et al. | 477/125 |
| 5,074,168 | 12/1991 | Ishikawa et al. | 477/126 |

FOREIGN PATENT DOCUMENTS 0354005  2/1990  European Pat. Off. ............... 477/126

*Primary Examiner*—Hoang Nguyen
*Attorney, Agent, or Firm*—Rossi & Associates

[57] ABSTRACT

A hydraulic control device for an automatic transmission includes a reverse inhibit valve for inhibiting a reverse gear position to be established when the reverse range is selected by mistake. This reverse inhibit valve is placed in a selected one of a first state in which a first port communicates with a third port, and a second state in which a second port communicates with the third port, depending upon whether a solenoid pressure is applied to one end of a spool of the valve. If the reverse range is selected during forward running of a vehicle, the reverse inhibit valve is placed in the first state in which the first port communicates with the third port, so that an oil pressure of a friction element is drained through the first port.

6 Claims, 9 Drawing Sheets

|  | REV/C | H/C | LOW/C | L&R/B | LOW OWC | B/B |
|---|---|---|---|---|---|---|
| 1st |  |  | ○ | ◌ | ◉ |  |
| 2nd |  |  | ○ |  |  | ○ |
| 3rd |  | ○ | ○ |  |  |  |
| 4th |  | ○ |  |  |  | ○ |
| REV | ○ |  |  | ○ |  |  |

| GEAR \ SOLENOID | SHIFT SOLENOID A | SHIFT SOLENOID B |
|---|---|---|
| 1st GEAR | O | O |
| 2nd GEAR | X | O |
| 3rd GEAR | X | X |
| 4th GEAR | O | X |

O ····· ON (DRAIN CIRCUIT CLOSED)
X ····· OFF (DRAIN CIRCUIT OPEN)

HYDRAULIC CONTROL DEVICE FOR AUTOMATIC TRANSMISSION

BACKGROUND OF THE INVENTION

1. Field of the Invention

The present invention relates to a hydraulic control device for an automatic transmission, and in particular to a technique of reverse inhibit control for inhibiting a reverse gear position from being established when a reverse range is selected by mistake.

2. Description of the Prior Art

There is known a reverse inhibit control device for inhibiting the rear gear position from being established when the reverse range is selected by mistake, as disclosed in Japanese Patent Application Laid-open No. 2-89864.

The known reverse inhibit control device, however, includes two valves, i.e., a 1–2 shift valve for applying a selected one of a forward low-speed range pressure and a reverse range pressure to a brake that is engaged in a forward low-speed range and a reverse range, and a reverse gear inhibit valve for inhibiting the rear gear position from being established. The use of these two valves makes a hydraulic circuit complicated, resulting in undesirably increased space, cost and weight of the hydraulic circuit.

SUMMARY OF THE INVENTION

It is therefore a first object of the present invention to provide a hydraulic control device for an automatic transmission having a reverse inhibit valve for inhibiting a reverse gear position from being established when a reverse range is selected by mistake, in which a hydraulic circuit for inhibiting the reverse gear position is available with reduced space, cost and weight.

To accomplish the above object, the reverse inhibit valve is placed in a selected one of a first state in which a first port communicates with a third port, and a second state in which a second port communicates with the third port, depending upon whether the solenoid pressure is applied to one end of a spool of the reverse inhibit valve or not, and the reverse inhibit valve is also placed in the first state in which the first port communicates with the third port when the reverse range is selected during forward running of a vehicle, so that an oil pressure of a friction element is drained through the first port.

It is a second object of the invention to eliminate influences encountered when the solenoid operates in a wrong manner or operates for other control.

To accomplish the above second object with respect to the hydraulic control device of the automatic transmission as described above, the spool of the reverse inhibit valve is formed with a pressure-receiving face to which a forward low-speed range pressure is applied, and the reverse inhibit valve is kept in the first state due to the force of the oil pressure applied to the pressure-receiving face while the forward low-speed range pressure is generated.

It is a third object of the invention to implement a plurality of controls by means of a single solenoid so as to reduce the cost.

To this end, the solenoid is used for other control in addition to the reverse inhibit control. In particular, the other control may be cut-back control for increasing a line pressure in a low-vehicle-speed range, and reducing the line pressure in a high-vehicle-speed range, depending upon whether the solenoid pressure is applied to a spool of a pressure regulator valve.

It is a fourth object of the invention to establish the reverse range and forward low-speed range with high reliability even if power to the solenoid is disconnected.

To accomplish this object, the solenoid is of a type which generates the solenoid pressure upon energization thereof, and the solenoid pressure is applied to the spool of the reverse inhibit valve to place the valve in the first state while the solenoid pressure is generated.

BRIEF DESCRIPTION OF THE DRAWINGS

The invention will be described in greater detail with reference to a certain preferred embodiment thereof and the accompanying drawings, wherein.

DETAILED DESCRIPTION OF THE PREFERRED EMBODIMENT

Figure 1:
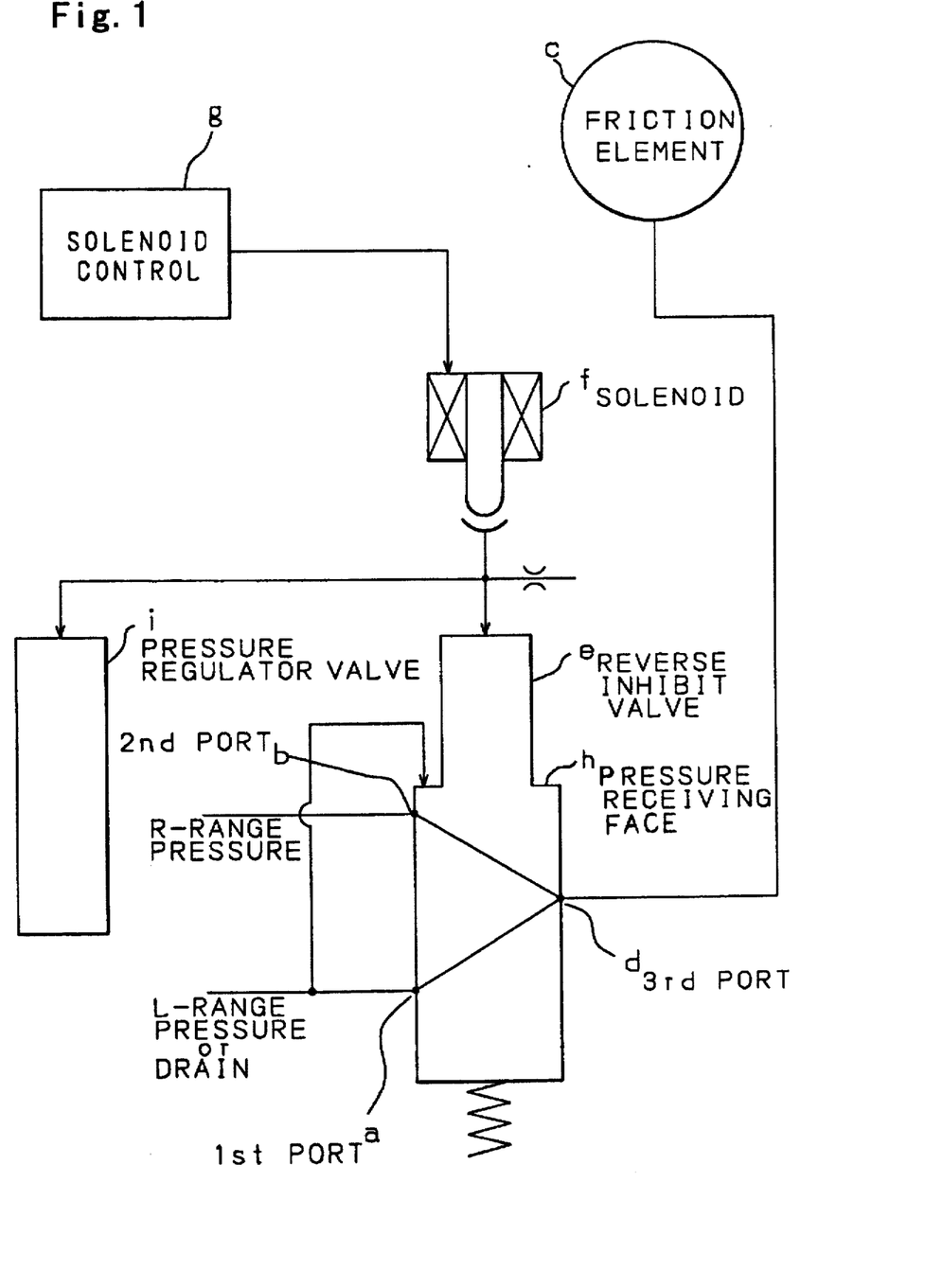
FIG. 1 is a view showing a reverse inhibit valve portion of a hydraulic control device for an automatic transmission as one preferred embodiment of the present invention.

FIG. 1 shows a reverse inhibit valve portion of a hydraulic control device for an automatic transmission. This portion includes a first port a receiving a forward low-speed range pressure generated when a forward low-speed range is selected, a second port b receiving a reverse pressure generated when a reverse range is selected, a third port d held in communication with a friction element c that is engaged when the forward low-speed range or reverse range is selected, a solenoid f for generating a solenoid pressure applied to one end of a spool of the reverse inhibit valve e, and solenoid control means g for controlling the solenoid pressure such that the solenoid pressure is generated or not generated.

The reverse inhibit valve e can be placed in a selected one of a first state in which the first port a communicates with the third port d, and a second state in which the second port b communicates with the third port d, depending upon whether the solenoid pressure is applied to the one end of the spool of the valve e. If the reverse range is selected while the vehicle is running forward, the reverse inhibit valve e is placed in the first state in which the first port a communicates with the third point d, so that an oil pressure in the friction element c is drained through the first port a.

The spool of the reverse inhibit valve e is formed with a pressure-receiving face h to which the forward low-speed range pressure is applied, whereby the reverse inhibit valve e is held in the first state due to the force of the oil pressure acting on this face h while the forward low-speed range pressure is generated.

The solenoid f is also connected to a pressure regulator valve i, and is adapted to effect cut-back control for increasing a line pressure in a low-vehicle-speed range, and reducing a line pressure in a high-vehicle-speed range, by applying or not applying the solenoid pressure to the spool of the pressure regulator valve i.

The solenoid f used in the present embodiment is of a type which generates the solenoid pressure when it is energized, and the solenoid pressure is applied to the spool of the reverse inhibit valve e so as to place the valve e in the first state upon energization of the solenoid f.

When the forward low-speed range is selected, and the reverse inhibit valve e is placed in the first state in which the first port a communicates with the third port d, the forward low-speed range pressure is entered through the first port a, and supplied to the friction element c through the third port d, so that the friction element c is engaged.

When the reverse range is selected, and the reverse inhibit valve e is placed in the second state in which the second port b communicates with the third port d, the reverse range pressure is entered through the second port b, and supplied to the friction element c through the third port d, so that the friction element c is engaged.

If the reverse range is selected by mistake while the vehicle is running forward, and the reverse inhibit valve e is placed in the first state in which the first port a communicates with the third port d, the oil pressure of the friction element c is drained through the third port d and the first port a, whereby the friction element c is disengaged, and the reverse gear position is thus inhibited from being established.

It will be understood from the above description that a single-valve structure consisting solely of the reverse inhibit valve e functions to switch from the first state to the second state and vice versa, and also to inhibit the reverse gear position from being established, depending upon whether or not the solenoid pressure is applied to one end of the spool of the valve e, from the solenoid f that is driven and controlled by the solenoid control means g.

When the forward low-speed range is selected, the forward low-speed range pressure is supplied to the friction element c through the first port a and the third port d, as described above. Since the pressure-receiving face h for receiving the forward low-speed range pressure is formed on the spool of the reverse inhibit valve e, this valve e is kept in the first state due to the force of the oil pressure applied to the face h while the forward low-speed range pressure is generated.

Accordingly, the first state of the reverse inhibit valve e is maintained irrespective of whether the solenoid pressure is applied to the end of the spool of the valve e or not. This means that the reverse inhibited valve e is held in the first state without suffering from any influence even if there arises an error in operating the solenoid upon selection of the forward low-speed range or if the solenoid is turned on and off due to other control.

Since the first state of the reverse inhibit valve e is maintained irrespective of whether the solenoid pressure is applied to one end of the spool of the valve e or not, the solenoid f can be used for other control as well as the above-described reverse inhibit control. For example, cut-back control is effected by selectively applying the solenoid pressure to a spool of the pressure regulator valve i, so that the line pressure is held at a relatively high level while the vehicle is running at a relatively low speed in the drive range or forward low-speed range, and the line pressure is held at a relatively low level while the vehicle is running at a relatively high speed.

The solenoid f, which is adapted to generate the solenoid pressure upon energization thereof, is controlled such that the solenoid pressure is applied to the spool of the reverse inhibit valve e so as to place the valve e in the first state when the solenoid pressure is generated upon energization of the solenoid f. If power to the solenoid f is disconnected, therefore, the reverse inhibit valve e is brought into the second state so as to establish the reverse gear position. While the forward low-speed range is selected, however, the first state is maintained with the forward low-speed range pressure applied to the pressure-receiving face h, so as to establish the forward low-speed gear position. Thus, the reverse gear position and the forward low-speed gear position are established without fail even if power to the solenoid is disconnected, though the reverse inhibit valve e is unable to perform the reverse inhibit function.

Figure 2:
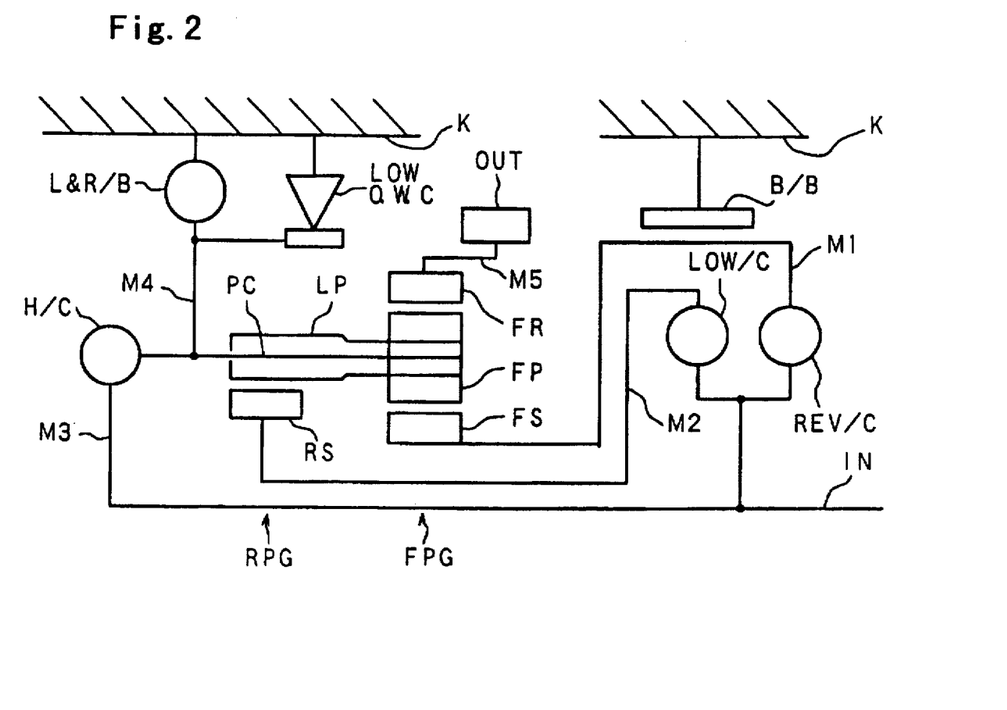
FIG. 2 is a schematic view showing a power transmitting system of the automatic transmission using the hydraulic control device of the preferred embodiment.

The hydraulic control device according to the present invention is used to control a power transmitting system of the automatic transmission as shown in FIG. 2. In FIG. 2, IN is an input shaft, and OUT is an output gear, while FPG is a front planetary gear, and RPG is a rear planetary gear. The front planetary gear FPG includes a front sun gear FS, a front ring gear FR, and a front pinion FP that is engageable with both of the gears FS, FR. The rear planetary gear RPG includes a rear sun gear RS, and a long pinion LP that is engageable with the gear RS and also with the front pinion FP. The front pinion FP and the long pinion LP are both supported by a common carrier PC.

In the above-described gear train arrangement, four members, i.e., front sun gear FS, rear sun gear RS, common carrier PC, and front ring gear FR, are involved with a shifting action of the transmission. Further, there are provided a reverse clutch REV/C, high clutch H/C, low clutch LOW/C, low & reverse brake L&R/B, low one-way clutch LOW O.W.C, and band brake B/B, which serve as shifting elements for connecting a selected one or ones of the above four members to the input shaft IN or fixing the selected member(s) to a case K, so as to establish forward 4-speed, reverse 1-speed gear positions.

The front sun gear FS is connected to the input shaft IN through a first rotary member M1 and the reverse clutch REV/C, and also connected to the case K through the first rotary member M1 and the band brake B/B. The rear sun gear RS is connected to the input shaft IN through a second rotary member M2 and the low clutch LOW/C. The common carrier PC is connected to the input shaft IN through the high clutch H/C and a third rotary member M3, and is also connected to the case K through a fourth rotary member M4, and the low & reverse brake L&R/B and low one-way clutch LOW O.W.C connected in parallel with each other. The front ring gear FR is connected to the output gear OUT through a fifth rotary member M5.

This power transmitting system is characterized in that it does not include a one-way clutch for controlling the shift timing so as to eliminate shift shocks upon shifting-down from 4-speed to 3-speed gear position, and a clutch that is engaged due to oil pressure and needed for ensuring the effect of engine braking when the above one-way clutch is employed. Thus, the number of shifting elements is reduced, leading to reduced size and weight of the power transmitting system.

Figure 3:
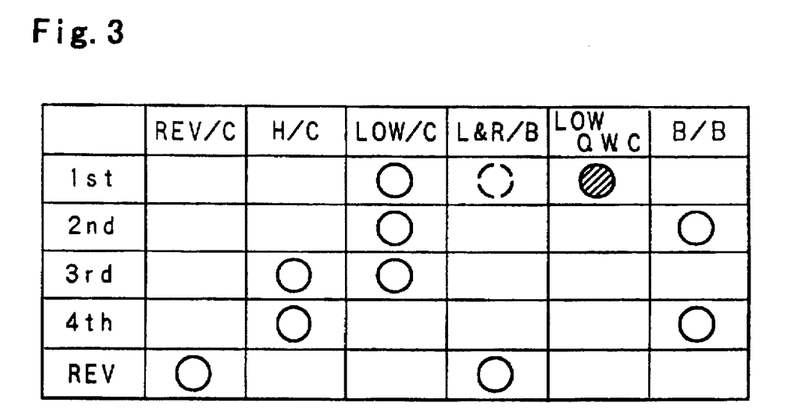
FIG. 3 is a view showing engaged states of elements of the automatic transmission using the hydraulic control device of the preferred embodiment.

FIG. 3 is a view showing engaged states of the shifting elements of the above-described power transmitting system for establishing the forward 4-speed, reverse 1-speed gear positions.

The 1st-speed gear position is established by hydraulically engaging the low clutch LOW/C, and hydraulically engaging the low & reverse brake L&R/B (when an engine brake range is selected) or mechanically engaging the low one-way clutch LOW O.W.C (when the vehicle is accelerated). In this case, the rear sun gear RS is connected to the input shaft IN, and the common carrier PC is fixed, while the front ring gear FR is connected to the output gear OUT.

The 2nd-speed gear position is established by hydraulically engaging the low clutch LOW/C and the band brake B/B. In this case, the rear sun gear RS is connected to the input shaft IN, and the front sun gear FS is fixed, while the front ring gear FR is connected to the output gear OUT.

The 3rd-speed gear position is established by hydraulically engaging the high clutch H/C and the low clutch LOW/C. In this case, the rear sun gear RS and common carrier PS are concurrently connected to the input shaft IN, and the front ring gear FR is connected to the output gear OUT, so that the transmission gear ratio becomes equal to 1.

The 4th-speed gear position is established by hydraulically engaging the high clutch H/C and the band brake B/B. In this case, the common carrier PC is connected to the input shaft IN, and the front sun gear FS is fixed, while the front ring gear FR is connected to the output gear OUT, so as to establish the overdrive gear position.

The reverse gear position is established by hydraulically engaging the reverse clutch REV/C and the low & reverse brake L&R/B. In this case, the front sun gear FS is connected to the input shaft IN, the common carrier PS is fixed, while the front ring gear FR is connected to the output gear OUT.

Figure 4A:
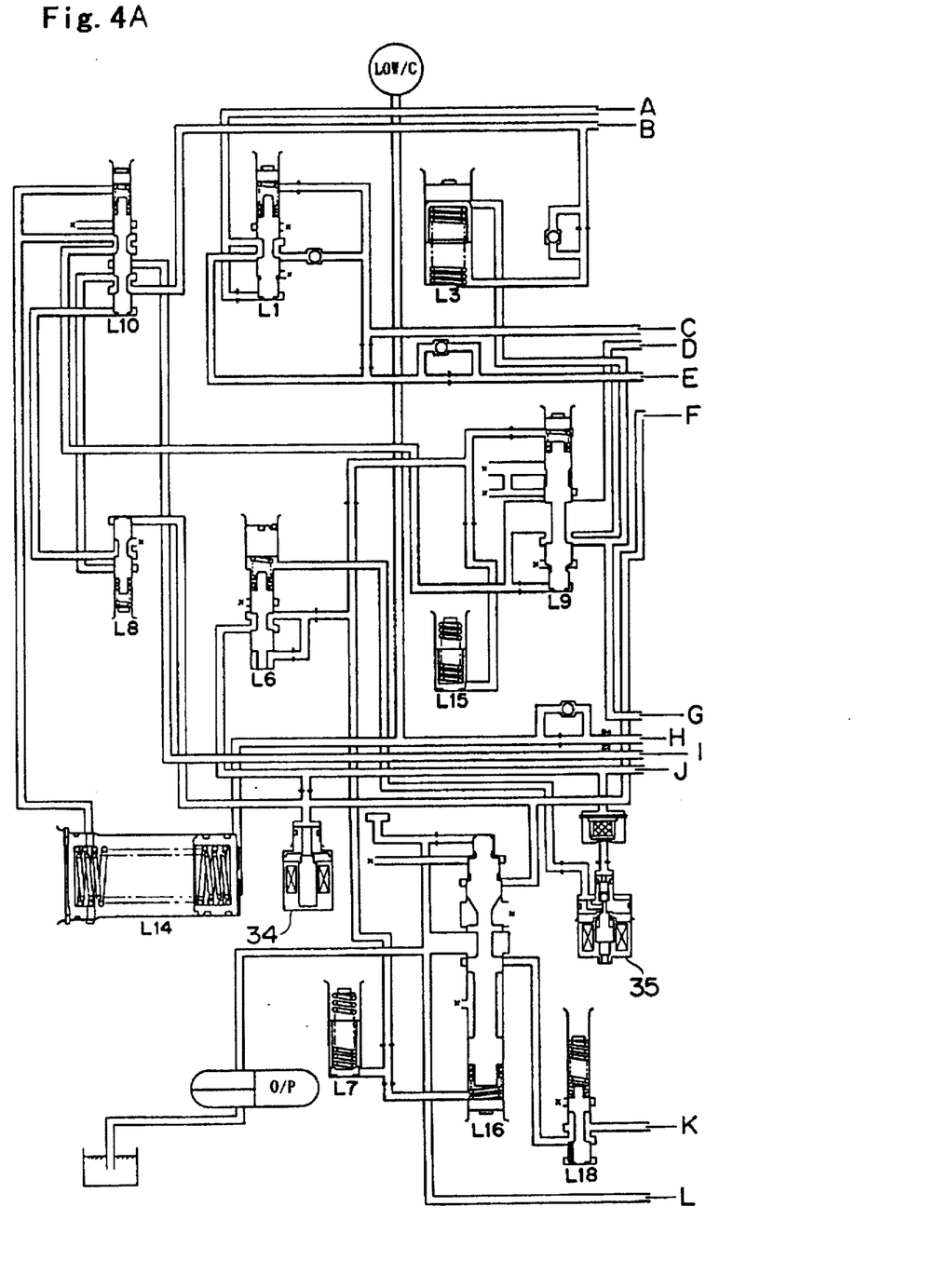
FIGS. 4A and 4B are views showing a hydraulic circuit of the whole control valve system including the reverse inhibit valve of FIG. 1.
Figure 4B:
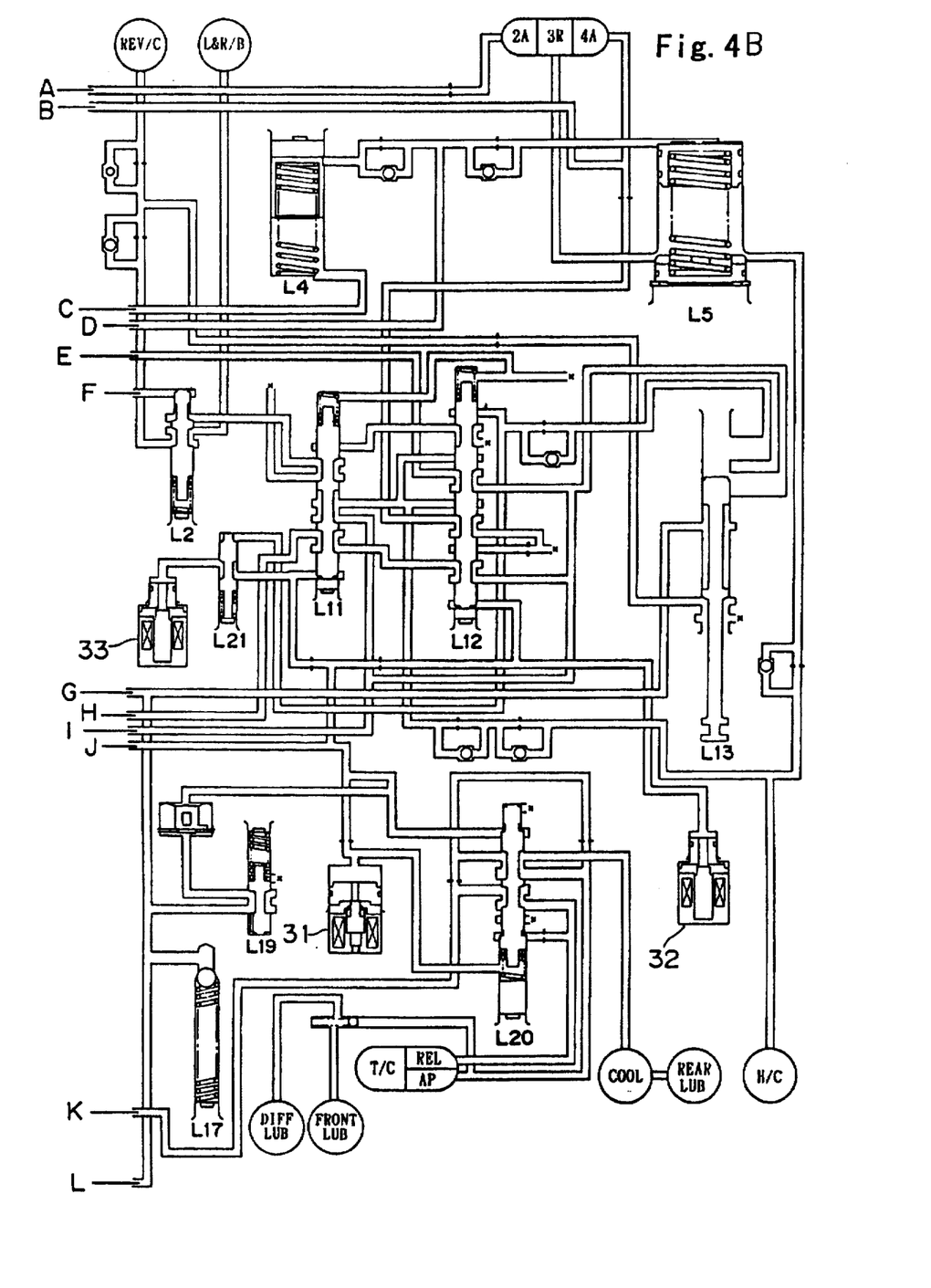

FIGS. 4A and 4B are hydraulic circuit diagrams showing the whole control valve system including the reverse inhibit valve as described above. In FIGS. 4A and 4B, L16 is a pressure regulator valve for controlling a pressure discharged from an oil pump to a line pressure depending upon the level of a pressure modifier pressure. L6 is a pressure modifier valve for reducing a pilot pressure depending upon the level of a throttle pressure, to prepare the pressure modifier pressure. L19 is a pilot valve for reducing the line pressure to prepare the pilot pressure as a constant pressure. L9 is an accumulator control valve for reducing the line pressure depending upon the level of the pressure modifier pressure, to prepare an accumulator control pressure. L18 is a torque converter pressure regulator valve for reducing the line pressure to prepare a torque converter pressure. L17 is a line pressure relief valve for defining the upper limit of the line pressure.

L12 and L11 are shift valve A and shift valve B, respectively, which effect switching of oil paths to establish each of the 1st-speed to 4th-speed (overdrive) gear positions according to the operation of shift solenoids. L20 is a lock-up control valve for selectively engaging and releasing a lock-up clutch according to the operation of a lock-up solenoid. This valve L20 also functions as a pressure-controlling valve during switching from an engaged state of the lock-up clutch to its released state and vice versa. L2 is a reverse inhibit valve for changing a circuit for applying the line pressure to the low & reverse brake according to the operation of a timing solenoid. L13 is a manual valve for delivering the line pressure to an appropriate control valve or valves according to a selected position of a select lever. L21 is a 2nd-speed hold valve for achieving a 2nd-speed gear ratio by placing the select lever in the 1-range, in case of failure of an electronic control system.

L10 and L8 are low clutch sequence valve and low clutch timing valve, respectively, for appropriately controlling the timing of engaging and releasing the low clutch upon shifting-up to the 4th-speed gear position or shifting-down from the 4th-speed gear position. L14 is a low-clutch accumulator for smoothly engaging the low clutch and also appropriately controlling the timing of engaging and releasing the low clutch. L1 and L4 are 1–2 modulator valve and 1–2 accumulator piston, respectively, which serve to smoothly engage the brake band upon shifting from the 1st-speed gear position to the 2nd-speed gear position. L5 is a 2–3 accumulator for smoothly engaging the high clutch and releasing the brake band upon shifting from the 2nd-speed gear position to the 3rd-speed gear position. L3 is a 3–4 accumulator for smoothly engaging the brake band upon shifting from the 3rd-speed gear position to the 4th-speed gear position. L15 and L7 are modifier accumulator and line-pressure accumulator, respectively, for preventing pulsation of the pressure modifier pressure and thus leveling this pressure.

In FIGS. 4A and 4B, 31 is the lock-up solenoid, 32 is a shift solenoid A, 33 is a shift solenoid B, 34 is the timing solenoid, 35 is a line-pressure solenoid, O/P is the oil pump, and T/C is the torque converter. Of the above-indicated solenoids, the lock-up solenoid 31 and line-pressure solenoid 35 are duty solenoids, and the shift solenoid A (32), shift solenoid B (33) and timing solenoid 34 are on-off solenoids. The lock-up clutch is incorporated in the torque converter T/c.

In the upper right portion of FIG. 4B, 2A is a 2nd-speed engaging pressure chamber of a band servo piston for operating the band brake B/B, 3R is a 3rd-speed releasing pressure chamber, and 4A is a 4th-speed engaging pressure chamber. The band brake B/B is engaged due to the hydraulic operation of the pressure chamber 2A only, and released due to the hydraulic operation of the pressure chambers 2A and 3R. The band brake B/B is also engaged due to the hydraulic operation of the pressure chambers 2A, 3R and 4A.

Figure 5:
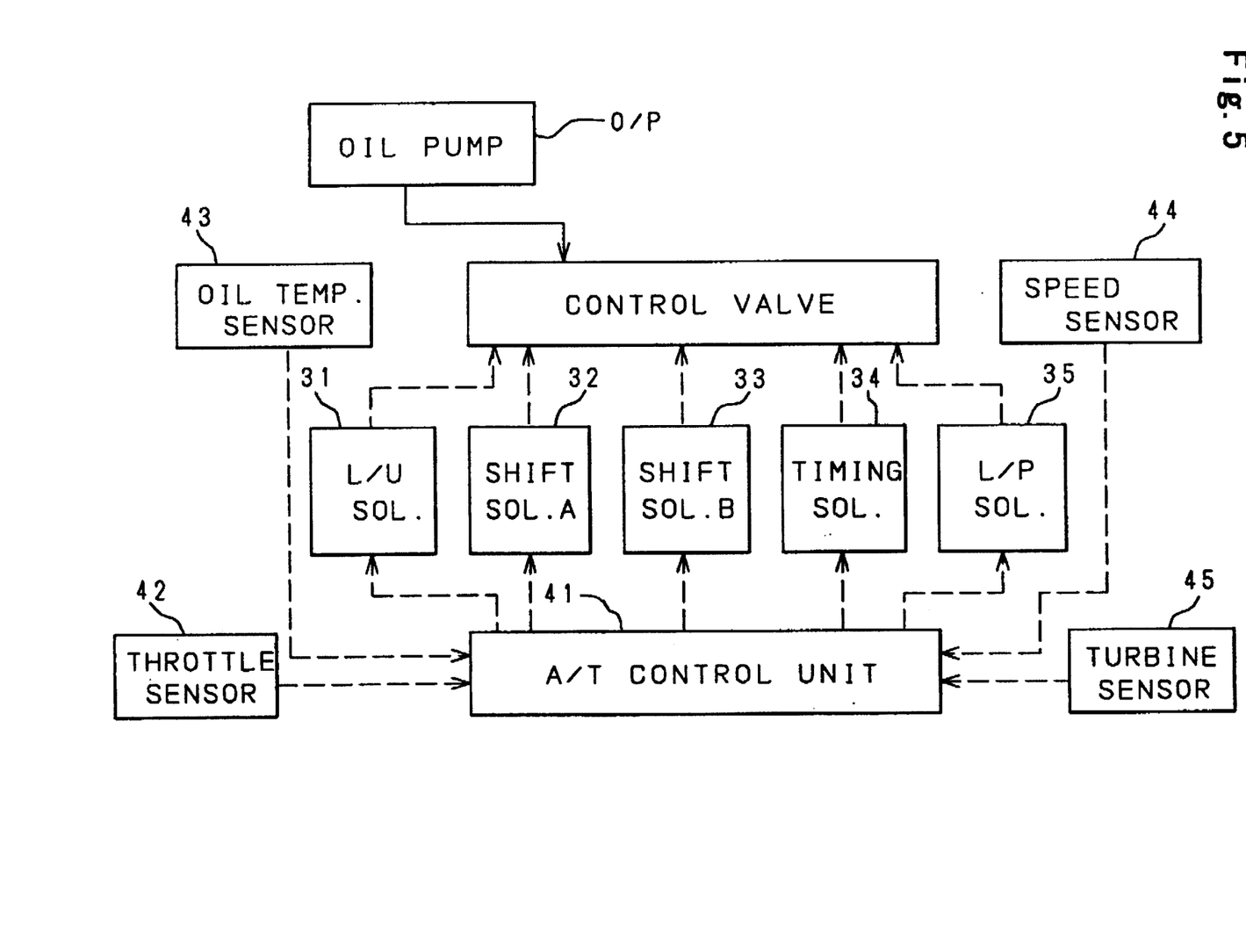
FIG. 5 is a block diagram of an electronic control system for the hydraulic control device of the above preferred embodiment.

FIG. 5 is a block diagram of an electronic control system for controlling the above hydraulic control device. The above-indicated solenoids 31, 32, 33, 34 and 35 are driven or controlled by an A/T control unit 41. This A/T control unit 41 receives signals from various sensors, such as a throttle sensor 42, oil temperature sensor 43, vehicle speed sensor 44, and turbine sensor 45, and various switches. The A/T control unit 41 effects arithmetic processing on the basis of input information obtained from detected signals, and predetermined control rules.

Figure 6:
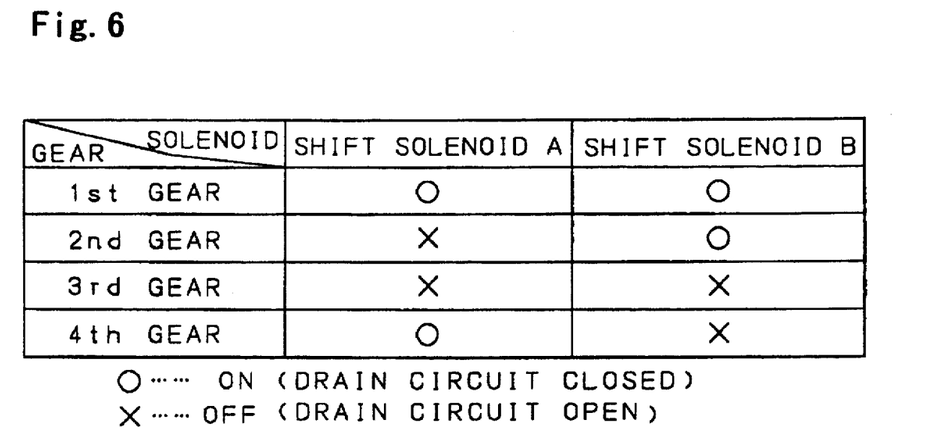
FIG. 6 is a view showing a table of operated states of shift solenoids of the control device of the preferred embodiment.
Figure 7:
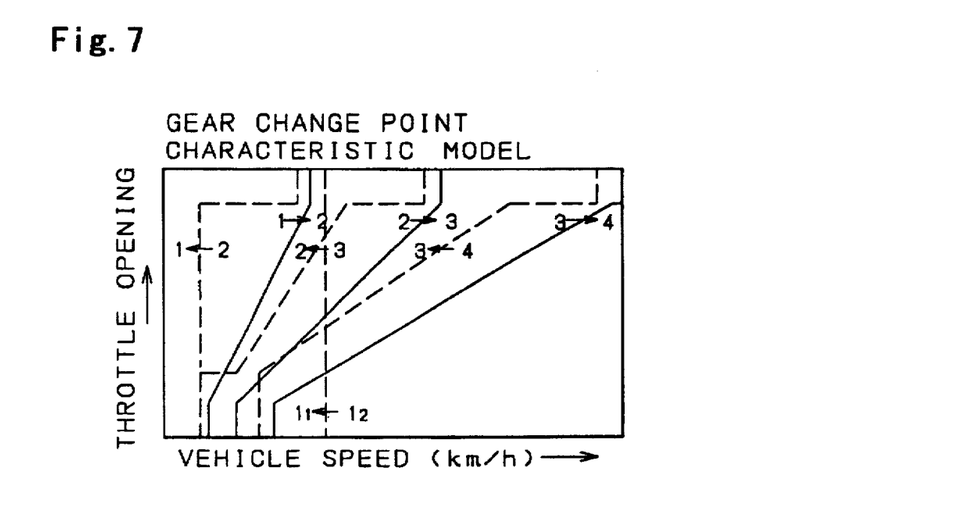
FIG. 7 is a view showing one example of characteristics of gear change points at which the transmission is shifted from one gear position to another.

FIG. 6 is a view showing a table of operated states of the shift solenoids A, B , and FIG. 7 is a view showing one example of gear change points at which the transmission gear ratio is changed.

The shift control by means of the shift solenoid A (32) and shift solenoid B (33) is effected by determining an appropriate gear position, on the basis of the gear change points as shown in FIG. 7 and detected throttle position(opening degree) and vehicle speed, and giving commands as to whether the solenoids 32, 33 are turned on or off according to the table of the operated states of the shift solenoids as shown in FIG. 6.

Figure 8:
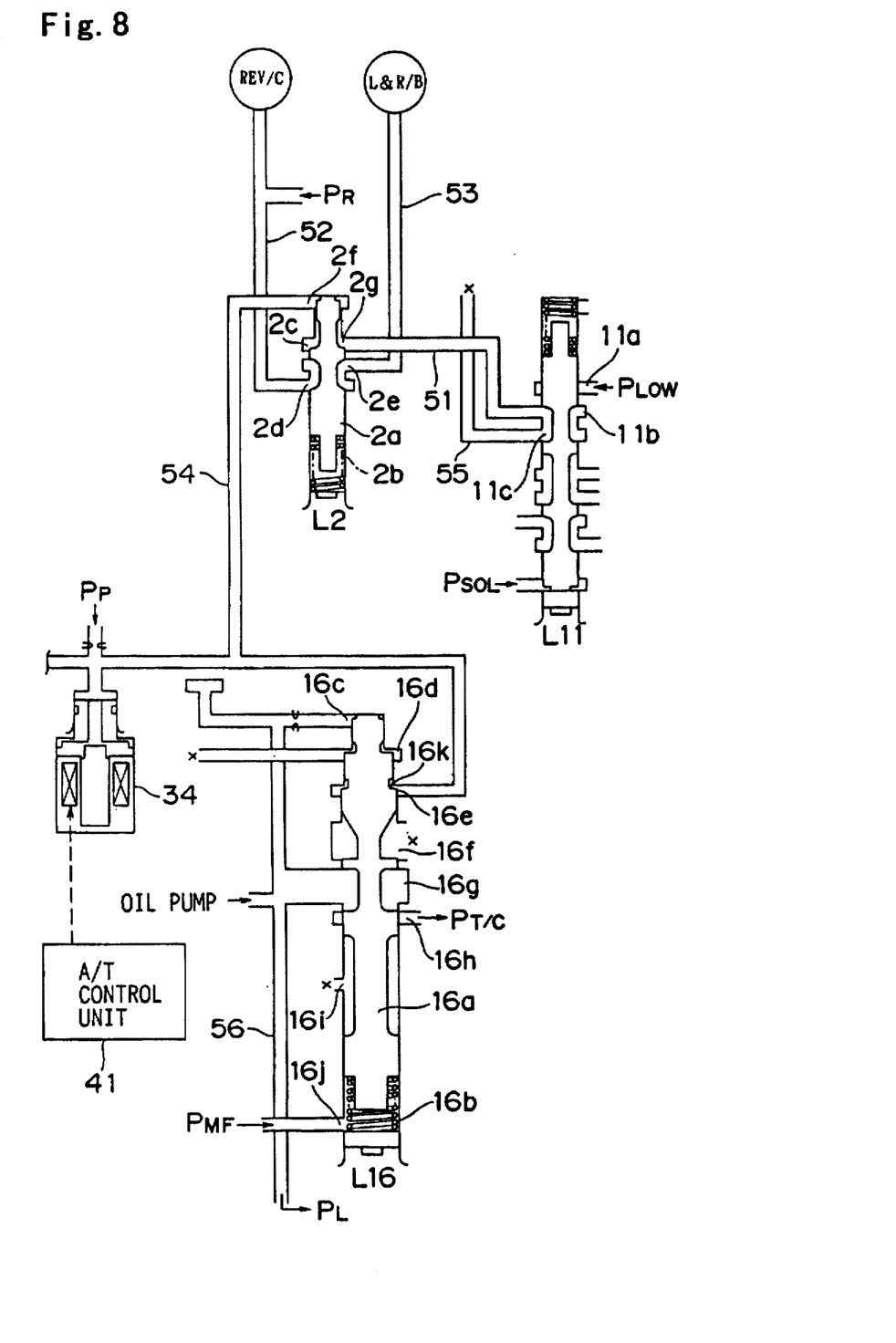
FIG. 8 is a hydraulic control diagram showing a principal part of the hydraulic control device of the preferred embodiment.

FIG. 8 shows a principal part of the hydraulic control device of the present embodiment.

REV/C is the reverse clutch, L & R/B is the low & reverse brake (corresponding to the friction element C), L2 is the reverse inhibit valve (corresponding to the reverse inhibit valve e), L11 is the shift valve B, L16 is the pressure regulator valve, 34 is the timing solenoid (corresponding to the solenoid f), and 41 is the A/T control unit (corresponding to the solenoid control means g).

The reverse clutch REV/C is engaged only for establishing the reverse gear position. The low & reverse brake L&R/B is engaged for establishing the reverse gear position and the 1st-speed gear position of the engine brake range.

The reverse inhibit valve L2 has a spool 2a slidably inserted through a valve hole, a spring 2b for biasing the spool 2a upward in FIG. 8, and a first port 2c, second port 2d, third port 2e, and solenoid pressure port 2f which are formed along the valve hole.

The first port 2c receives a low range pressure $P_{LOW}$ (forward low-speed range pressure) generated upon selection of the engine brake range (forward low-speed range), through a low range pressure oil path 51 extending from the shift valve B (L11).

The second port 2d receives a reverse pressure $P_R$ generated upon selection of the reverse range, through a reverse pressure oil path 52 extending from the manual valve L13 (not shown in FIG. 8).

The third port 2e communicates with the low & reverse brake L&R/B that is engaged upon selection of the engine brake range or reverse range, through the low & reverse brake pressure oil path 53.

The solenoid pressure port 2f communicates with a solenoid pressure oil path 54 extending from the timing solenoid 34, so that the solenoid pressure $P_{SOL}$ is applied to the upper end (in FIG. 8) of the spool 2a upon energization of the timing solenoid 34.

Namely, the reverse inhibit valve L2 is selectively placed in the first state in which the solenoid pressure $P_{SOL}$ is applied to the upper end of the spool 2a so that the first port 2c communicates with the third ports 2c, 2e, and the second state (as shown in FIG. 8) in which the solenoid pressure $P_{SOL}$ is not applied to the upper end of the spool 2a so that the second port 2d communicates with the third port 2e. If the reverse range is selected by mistake while the vehicle is running forward, the reverse inhibit valve L2 is placed in the first state where the first port 2c communicates with the third port 2e, so that the oil pressure of the low & reverse brake L&R/B is drained through the low & reverse brake pressure oil path 53, third port 2e, first port 2c, low range pressure oil path 51 and drain oil path 55, whereby the reverse gear position is inhibited from being established.

The spool 2a of the reverse inhibit valve L2 is formed with a pressure-receiving face 2g to which the low range pressure $P_{LOW}$ is to be applied. While the low range pressure $P_{LOW}$ is generated with the 1st-speed gear position selected in the engine brake range, the reverse inhibit valve L2 is kept in the first state where the first port 2c communicates with the third port 2e due to the force of the low range pressure $P_{LOW}$ applied to the pressure-receiving face 2g, irrespective of the presence of the solenoid pressure $P_{SOL}$.

The shift valve B (L11) is a switch valve that operates upon receiving the solenoid pressure $P_{SOL}$ from the shift solenoid B as a signal pressure. With the 1st-speed gear position selected, port 11a and port 11b of the shift valve B communicate with each other, so that the low range pressure $P_{LOW}$ is supplied to the low range pressure oil path 51. With the reverse range selected, port 11b and port 11c of this valve B communicate with each other, so that the oil in the low range pressure oil path 51 is drained.

The above-indicated pressure regulator valve L16 includes a spool 16a slidably inserted through a valve hole, a spring 16b for biasing the spool 16a upward in FIG. 8, and a feed-back line pressure port 16c, drain port 16d, pilot pressure port 16e, drain port 16f, line pressure port 16g, torque converter pressure port 16h, drain port 16i, and pressure modifier pressure port 16j, which are formed along the valve hole.

The pilot pressure port 16e communicates with the solenoid pressure oil path 54 extending from the timing solenoid 34, so that the solenoid pressure $P_{SOL}$ is applied to a stepped face 16k of the spool 16a upon energization of the timing solenoid 34, so as to reduce the line pressure PL due to the force of the oil pressure for moving the spool 16a downward (in FIG. 8). Thus, the timing solenoid 34 is used for cut-back control for increasing the line pressure $P_L$ in a low-vehicle-speed range, as well as the reverse inhibit control as described above. In FIG. 8, reference numeral 56 denotes a line pressure oil path.

The timing solenoid 34 is of the type which generates the solenoid pressure $P_{SOL}$ upon energization thereof, and is adapted to apply the solenoid pressure $P_{SOL}$ to the spool 2a of the reverse inhibit valve L2 upon generation of a pilot pressure so that the valve L2 is placed in the first state.

The operation of the hydraulic control device of the present invention will be explained.

Reverse Inhibit Control

Figure 9:
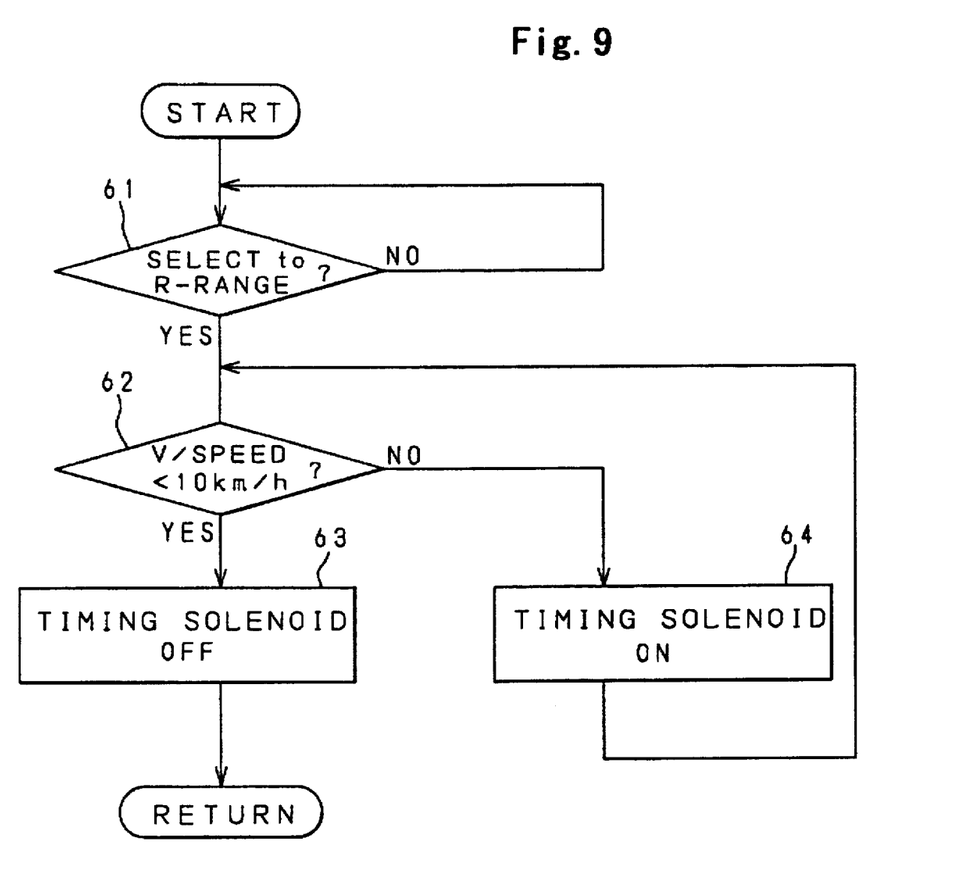
FIG. 9 is a flow chart showing the flow of reverse inhibit control operation implemented by an A/T control unit of the hydraulic control device of the preferred embodiment.

FIG. 9 is a flow chart showing the flow of the reverse inhibit control operation effected by the A/T control unit 41.

In step 61, a signal representing a selected position is observed, to determine whether the transmission is shifted from a range other than the reverse range to the reverse range.

If it is determined that the transmission is shifted from a range other than the reverse range to the reverse range, step 62 is then executed to determine whether the vehicle speed detected by the vehicle speed sensor 44 is less than 10km/h or not. This step is meant to determine whether the reverse range has been selected by mistake. Since the reverse range is normally selected while the vehicle is stopped or running at an extremely low speed, it is determined that the selection of the reverse range is due to a driver's mistake when the detected vehicle speed is 10km/h or higher.

If an affirmative decision is obtained in step 62, step 63 is executed to generate a command to turn off the timing solenoid 34.

If a negative decision is obtained in step 62, step 64 is executed to generate a command to turn on the timing solenoid 34.

Cut-back Control

Figure 10:
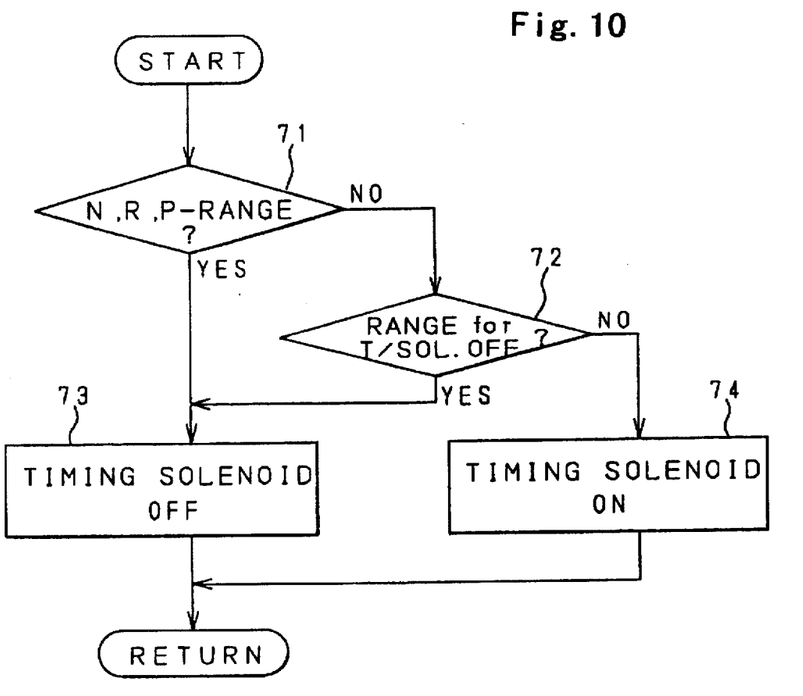
FIG. 10 is a flow chart showing the flow of cut-back control operation implemented by the A/T control unit of the hydraulic control device of the preferred embodiment.

FIG. 10 is a flow chart showing the flow of the cut-back control operation effected by the A/T control unit 41.

In step 71, a signal representing a selected position is observed, to determine whether any one of N (neutral), R (reverse) and P (parking) ranges is selected or not. If none of the N, R and P ranges is selected, step 72 is executed to determine whether the timing solenoid is in an OFF region.

If an affirmative decision is obtained in step 71, or when it is determined in step 72 that the timing solenoid is in the OFF region, step 73 is implemented to generate a command to turn off the timing solenoid 34. If it is determined in step 72 that the timing solenoid is in an ON region, step 74 is executed to generate a command to turn on the timing solenoid 34.

Figure 11A:
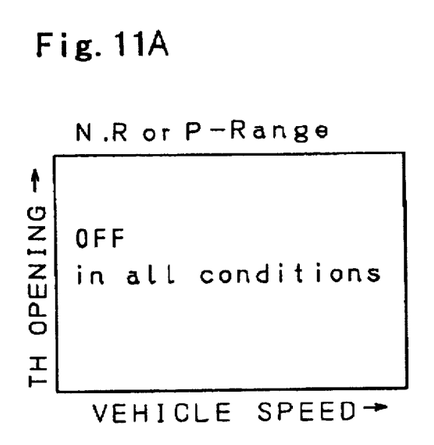
FIG. 11 is a view showing a cut-back control map used by the hydraulic control device of the preferred embodiment.
Figure 11B:
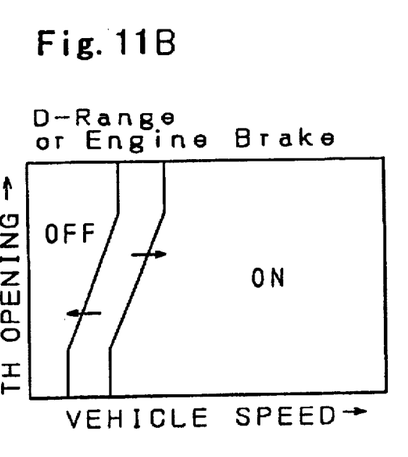

As shown in a cut-back control map of FIG. 11, the solenoid is turned off in the whole region (high line pressure) when any one of the N, R, P ranges is selected, irrespective of the throttle position (opening degree) and the vehicle speed. When the D (drive) or engine brake range is selected, the solenoid is turned off (for a high line pressure) in a relatively low-vehicle-speed range and turned on (for a low line pressure) in a relatively high-vehicle-speed range, depending upon the throttle position and the vehicle speed. The switching line between the OFF region and the ON region is offset to some extent so as to avoid control hunting.

Reverse Range select operation

When the driver wishes to back the vehicle up and selects the reverse range, the control flow goes to step 61, step 62 and to step 63 in FIG. 9, so that the timing solenoid 34 is turned off, and the solenoid pressure $P_{SOL}$ is not supplied to the reverse inhibit valve L2. As a result, the spool 2a of the reverse inhibit valve L2 is placed in the second state in which the ports 2d, 2e communicate with each other, as shown in FIG. 8.

Upon the above selection of the reverse range, therefore, the reverse pressure $P_R$ fed from the manual valve L13 is supplied to the reverse clutch REV/C through the reverse clutch pressure oil path 52, and also supplied to the low & reverse brake L&R/B through the second port 2d and third port 2e of the reverse inhibit valve L2, and the low & reverse brake pressure oil path 53. Thus, the elements REV/C and L&R/B are engaged so as to establish the reverse gear position.

Reverse Inhibit Operation

When the driver selects the reverse range by mistake during running of the vehicle, the control flow goes to step 61, step 62 and to step 64 in FIG. 9, so that the timing solenoid 34 is turned on, and the solenoid pressure $P_{SOL}$ is supplied to the reverse inhibit valve L2. As a result, the spool 2a of the reverse inhibit valve L2 is pushed down from the position as shown in FIG. 8, to be placed in the first state in which the ports 2c, 2e communicate with each other.

Upon the above selection of the reverse range, therefore, the reverse pressure $P_R$ fed from the manual valve L13 is supplied only to the reverse clutch REV/C, through the reverse clutch pressure oil path 52. Consequently, the oil in the low & reverse brake L&R/B is drained from the low & reverse brake pressure oil path 53, third port 2e, first port 2c, low range pressure oil path 51, and drain oil path 55 or port 11a, through the manual valve L13, so as to inhibit the reverse gear position from being established.

Engine Brake Range select operation

When the driver wishes to apply an engine brake during running of the vehicle, and selects from the D (drive) range to the engine brake range, the low range pressure $P_{LOW}$ fed from the manual valve L13 is supplied to the reverse inhibit valve L2, through the shift valve A (L12), shift valve B (L11) and low range pressure oil path 51. With the low range pressure $P_{LOW}$ applied to the pressure-receiving face 2g formed on the spool 2a of the reverse inhibit valve L2, the spool 2a is pushed down from the position as shown in FIG. 8, to be placed in the first state in which the ports 2c, 2e communicate with each other, and the low range pressure $P_{LOW}$ is supplied to the low & reverse brake L&R/B, through the low & reverse brake pressure oil path 53.

While the low range pressure $P_{LOW}$ is generated in the 1st-speed gear position of the engine brake range, therefore, the reverse inhibit valve L2 is kept in the first state where the first port 2c and the third port 2e communicate with each other, irrespective of the presence of the solenoid pressure $P_{SOL}$, so as to establish the 1st-speed gear position.

In other words, in the engine brake range, the spool 2a does not move even if the timing solenoid 43 operates in a wrong manner or is turned on and off to carry out other control. In the present embodiment, the timing solenoid 43 is also used as a solenoid for the above-described cut-back control. Upon selection of the engine brake range, therefore, the timing solenoid 43 may be used for the cut-back control.

With the timing solenoid 43 used for both the reverse inhibit control and the cut-back control, the timing solenoid 43 is turned on when the reverse range is selected by mistake, so as to implement the reverse inhibit control and at the same time reduce the line pressure $P_L$, even with a control rule that the solenoid 43 is to be in the OFF position in the reverse range for the cut-back control. During the reverse inhibit control for inhibiting the reverse gear position from being established, however, the line pressure $P_L$ is not required to be kept at a high level, and thus no problem arises from interference between different controls.

The present embodiment constructed as described above yields the following effects.

(1) The reverse inhibit valve L2 is placed in a selected one of the first state in which the first port 2c communicates with the third port 2e, and the second state in which the second port 2d communicates with the third port 2e, depending upon whether the solenoid pressure $P_{SOL}$ is applied to one end of the spool 2a or not. If the reverse range is selected during forward running of the vehicle, the reverse inhibit valve L2 is placed in the first state where the first port 2c communicates with the third port 2e, so that the oil pressure of the low & reverse brake L&R/B is drained through the first port 2c. Thus, a hydraulic circuit for inhibiting the reverse gear can be provided which is advantageous in terms of space, cost and weight.

(2) The spool 2a of the reverse inhibit valve L2 is formed with the pressure-receiving face 2g to which the low range pressure $P_{LOW}$ is applied. Since the reverse inhibit valve L2 is kept in the first state due to the force of the oil pressure acting on this face 2a while the low range pressure $P_{LOW}$ is generated, any influence on this state of the valve L2 can be eliminated even if the solenoid operates in a wrong manner or operates for other control.

(3) The timing solenoid 34 can be used for other control than the reverse inhibit control. Thus, a plurality of controls may be accomplished only with the single timing solenoid 34 at a reduced cost.

(4) As the above-indicated other control, cutback control may be effected for increasing the line pressure $P_L$ in the low-vehicle-speed range, and reducing the line pressure $P_L$ in the high-vehicle-speed range, by applying or not applying the solenoid pressure to the spool 16a of the pressure regulator valve L16. Thus, the reverse inhibit control and cut-back control can be accomplished by the single timing solenoid 34 at a reduced cost.

(5) The timing solenoid 34 is of the type which generates the solenoid pressure $P_{SOL}$ upon energization thereof, and the solenoid pressure $P_{SOL}$ thus generated is applied to the spool 2a of the reverse inhibit valve L2 so as to place the valve L2 in the first state. In this arrangement, the reverse range (the second state of the valve L2) and the engine brake range (the first state due to the pressure applied to the pressure-receiving face 2g) are surely established even when power to the solenoid is disconnected.

While the present embodiment has been described referring to drawings, the present invention is not limited to details of the illustrated embodiment, but may be embodied with various changes and additions, without departing from the principle of the invention.

While the cut-back control is employed as a control other than the reverse inhibit control in the illustrated embodiment, any control other than the cut-back control may be implemented.

What is claimed is:

1. A hydraulic control device for an automatic transmission, comprising:

a reverse inhibit valve including a first port receiving a forward low-speed range pressure generated when a forward low-speed range is selected, a second port receiving a reverse pressure generated when a reverse range is selected, and a third port that communicates with a friction element when one of the forward low-speed range and the reverse range is selected;

a solenoid for generating a solenoid pressure to be applied to one end of a spool of said reverse inhibit valve; and solenoid control means for controlling said solenoid so as to generate the solenoid pressure in a controlled manner; and wherein said reverse inhibit valve is placed in a selected one of a first state in which said first port communicates with said third port, and a second state in which said second port communicates with the third port, depending upon whether the solenoid pressure is applied to said one end of said spool of the reverse inhibit valve or not, and wherein the reverse inhibit valve is placed in said first state in which the first port communicates with the third port when the reverse range is selected during forward running of a vehicle, so that an oil pressure of said friction element is drained through the first port.

2. A hydraulic control device for an automatic transmission as defined in claim 1, wherein said reverse inhibit valve is placed in said first state when the reverse range is selected at a speed lower than a predetermined running speed during forward running of a vehicle.

3. A hydraulic control device for an automatic transmission as defined in claim i or claim 2, wherein said spool of said reverse inhibit valve is formed with a pressure-receiving face to which the forward low-speed range pressure is applied, and wherein the reverse inhibit valve is kept in said first state due to force of an oil pressure applied to said pressure-receiving face while the forward low-speed range pressure is generated.

4. A hydraulic control device for an automatic transmission as defined in claim 3, wherein said solenoid is used for other control in addition to reverse inhibit control.

5. A hydraulic control device for an automatic transmission as defined in claim 4, wherein said other control is cut-back control for increasing a line pressure in a low-vehicle-speed range, an reducing the line pressure in a high-vehicle-speed range, depending upon whether the solenoid pressure is applied to a spool of a pressure regulator valve or not.

6. A hydraulic control device for an automatic transmission as defined in claim 3, wherein said solenoid is of a type which generates the solenoid pressure upon energization thereof, and the solenoid pressure is applied to said spool of said reverse inhibit valve to establish said first state when the solenoid pressure is generated.

* * * * *